United States Patent
Swan et al.

(10) Patent No.: US 8,655,730 B1
(45) Date of Patent: Feb. 18, 2014

(54) SELECTING ADVERTISEMENTS BASED ON ADVERTISING REVENUE MODEL

(75) Inventors: Charles D. Swan, Seattle, WA (US); Zhuo Zhang, Mercer Island, WA (US); Brent E. Edwards, Seattle, WA (US); Mark E. Brighton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 79 days.

(21) Appl. No.: 13/247,486

(22) Filed: Sep. 28, 2011

(51) Int. Cl.
  *G06Q 30/00* (2012.01)
(52) U.S. Cl.
  USPC .................................. 705/14.69; 705/14.53
(58) Field of Classification Search
  CPC ...................................................... G06Q 30/00
  USPC ..................................................... 705/14.69
  See application file for complete search history.

(56) References Cited

U.S. PATENT DOCUMENTS

| | | | |
|---|---|---|---|
| 7,295,995 B1 | 11/2007 | York et al. | |
| 7,536,351 B2 | 5/2009 | Leblang et al. | |
| 7,720,723 B2 | 5/2010 | Dicker et al. | |
| 7,734,502 B1 | 6/2010 | Yehoshua et al. | |
| 7,966,334 B1 | 6/2011 | Bezos et al. | |
| 8,112,310 B1 | 2/2012 | Yehoshua et al. | |
| 8,190,474 B2 * | 5/2012 | Lerman et al. | 705/14.41 |
| 8,260,777 B1 | 9/2012 | Manber | |
| 2003/0046161 A1 * | 3/2003 | Kamangar et al. | 705/14 |
| 2003/0149938 A1 | 8/2003 | McElfresh et al. | |
| 2004/0044571 A1 | 3/2004 | Bronnimann et al. | |
| 2006/0004628 A1 * | 1/2006 | Axe et al. | 705/14 |
| 2007/0067297 A1 | 3/2007 | Kublickis | |
| 2008/0086558 A1 * | 4/2008 | Bahadori et al. | 709/224 |
| 2010/0146380 A1 * | 6/2010 | Rousso et al. | 715/234 |

OTHER PUBLICATIONS

Stapel, Elizabeth. "Finding the Inverse of a Function." Purplemath. Available from http://www.purplemath.com/modules/invrsfcn3.htm. Accessed Feb. 6, 2013.*

* cited by examiner

*Primary Examiner* — John G Weiss
*Assistant Examiner* — Dipen Patel
(74) *Attorney, Agent, or Firm* — Knobbe Martens Olson & Bear LLP

(57) ABSTRACT

Advertising revenue may be optimized by selecting an advertisement to display to a user based at least in part on the user's browsing history and a revenue model associated with the advertisement. For example, if the user has a relatively high clicking frequency on advertisements, then pay-per-click advertisements may be selected for presentation to the user rather than pay-per-impression advertisements. Revenue model-based advertisement selection may be combined with other advertising techniques, such as targeting.

24 Claims, 5 Drawing Sheets

SELECTING ADVERTISEMENTS BASED ON ADVERTISING REVENUE MODEL

BACKGROUND

Online advertising is a widely used form of promotion that uses that the Internet, the World Wide Web or other networks, such as telecommunications networks, to deliver marketing messages to users. Examples of online advertising include advertisements that are associated with web pages, social networking or electronic messages, such as email, text messages (often referred to as SMS messages) or multimedia messages (often referred to as MMS messages). Online advertising may offer many potential advantages over traditional advertising, including speed, investment efficiency, customization and/or interactivity.

Online advertising may be purchased using various advertising revenue models. For example, in a "pay-per-impression" advertising revenue model, also referred to as "cost-per-impression", "pay-per-view", "cost-per-view" or "cost-per-mille", advertisers are charged for each unique user view or exposure to an advertisement. In a "pay-per-click" or "cost-per-click" advertising revenue model, advertisers are charged each time a user clicks on an advertisement. As used herein, a "click" refers to any action by a user to select an advertisement for further activity, such as being directed to an advertiser's website, as opposed to merely viewing or being exposed to the advertisement. A "pay-per-action" or "pay-per-acquisition" advertising revenue model, also referred to as "cost-per-action" or "cost-per acquisition" is performance-based, wherein advertisers are charged only if the user completes a transaction associated with the advertisement, such as by purchase of the advertised product, by sign up for the advertised service, etc., often within a certain time period. There are many variations of these and other advertising revenue models.

DETAILED DESCRIPTION

Figure 1:
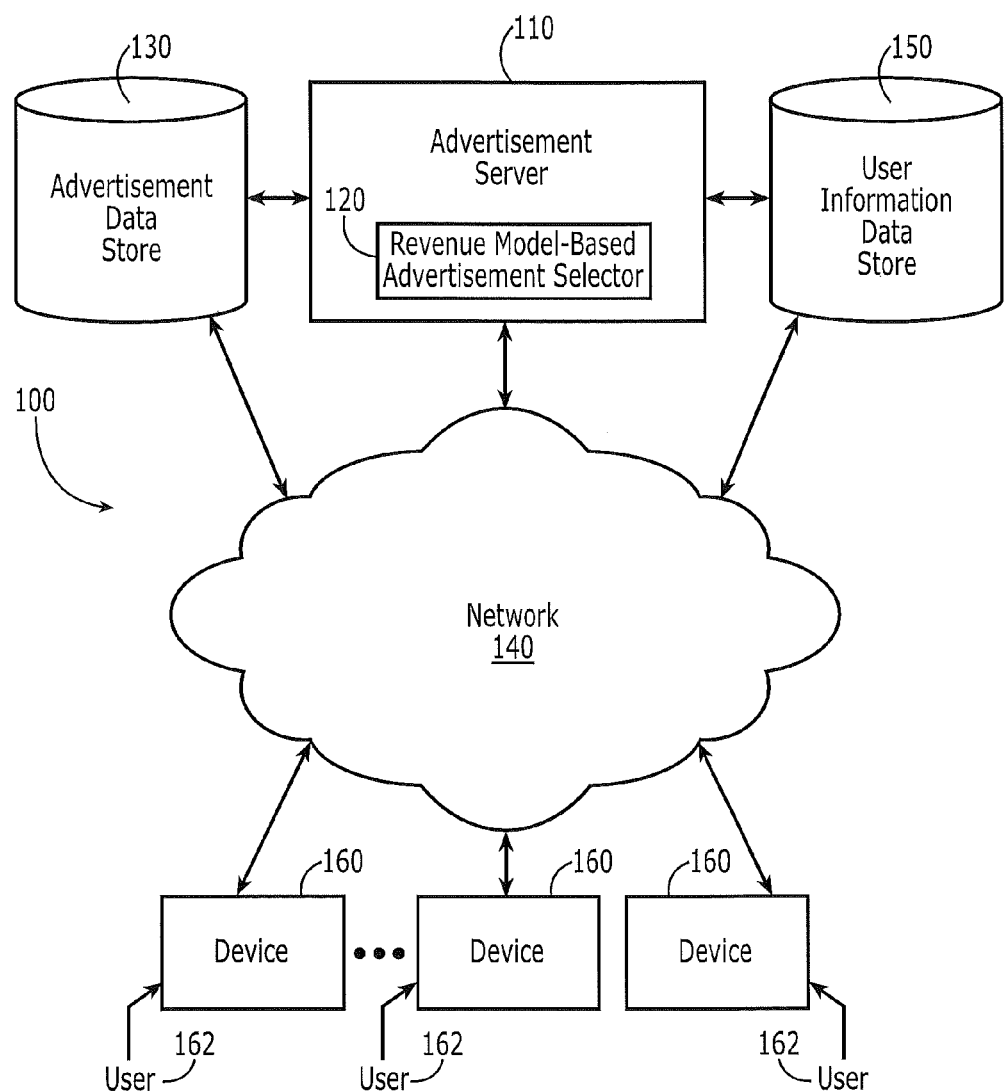
FIG. 1 is a block diagram of devices, methods and/or computer program products for adjusting an advertising revenue model mix based on user behavior according to various embodiments described herein.

Various embodiments described herein can increase or optimize advertising revenue by selecting an advertisement to display to a user based at least in part on the user's browsing history and a revenue model associated with the advertisement. In general, an advertisement may be selected for presentation to a user based at least on part on the user's history of interacting with previously presented advertisements and the revenue model associated with the advertisement. For example, assume that the user has a relatively high clicking frequency on advertisements. Then, one or more pay-per-click advertisements may be selected for presentation to the user rather than pay-per-impression advertisements. Advertising revenue model-based advertisement selection is thereby provided.

In a web browsing scenario, a call may be made by a browser to an advertising server for an advertisement for display to a user. In response to this call, advertisements that may be displayed to the user are identified. This identification may take place, for example, based on conventional targeting techniques. Once a group or collection of possible advertisements is identified, the user's past behavior is examined to determine, for example, whether the user clicks on advertisements with a relatively high frequency, generally does not click on advertisements, generally buys or does not buy products shown in advertisements, etc. Based on the user's past behavior in response to advertisements, a determination is made as to whether one or more advertisements should be a pay-per-click advertisement, a pay-per-impression advertisement, a pay-per-acquisition advertisement or an advertisement based on another advertising revenue model. The one or more advertisements that are selected based on the advertising revenue model are then provided to the browser for display on the web page. In some embodiments, all of the advertisements that are selected may be pay-per-impression advertisements if the user never or rarely clicks on advertisements. However, in other embodiments, when multiple advertisements are presented to the user in parallel or serially, a mixture or combination of advertisements of various revenue models may be presented.

Revenue model-based advertisement selection may be provided according to various embodiments described herein, independent of or combined with other techniques of increasing revenue from advertisements. For example; contextual or behavioral targeting criteria may also be used to initially identify the multiple advertisements that can be provided for presentation to the user, subject to further selection based at least in part on the user's past interaction with advertisements and the associated advertising revenue models of the identified advertisements. In other embodiments, contextual or behavioral targeting criteria may be applied to the advertisements that were selected by the revenue model-based advertisement selection.

Moreover, when the advertising is designed for multiple marketing campaigns or programs, the advertising revenue model-based advertisement selection may be performed on a per-campaign or per-program basis, based at least in part on the user's past interaction with past responses of the advertisements for the given campaign or program. Similarly, when the advertising is designed for multiple product categories or multiple service categories, the advertising revenue model-based advertisement selection may be performed separately for a given product category or service category. In other embodiments, the user's past interaction with advertisements and the revenue models that are associated with campaigns, programs, product categories or service categories may be used as a basis for selecting a given campaign, program, product category or service category for presentation to the user.

The revenue model-based advertisement selection may also be based at least in part on past purchases of the user of goods and/or services. For example, advertisements of a given advertising revenue model may be selected for advertisements for goods/services similar to those already purchased by the user compared to goods/services that are not similar to those already purchased by the user. The revenue model may also be further selected in response to an identification of the user as a "directed shopper" that appears to be shopping for goods or services, rather than a user that is just viewing the advertisements and/or content. This identification may take place based on, for example, an average session length of the user, where a short average session length may indicate a directed shopper. The revenue model may also be selected in order to induce an interaction from the user that differs from the past interactions of the user to advertisements. Stated differently, revenue model-based advertising selection may be used to try to induce "exploration" by the user. These techniques may be used in various combinations and subcombinations.

Moreover, many of the techniques described above may be used independent of a user's past interaction with advertisements. For example, revenue model-based advertisement selection may be used in response to identifying a user as a directed shopper. In some embodiments, an advertisement may be selected based at least in part on an average session length of the user and the associated advertising revenue models of potential advertisements.

Overall Architecture for Advertising Revenue Model-Based Selection

FIG. 1 is a block diagram of systems, devices (such as servers), methods and/or computer program products for revenue model-based advertisement selection according to various embodiments described herein. Referring now to FIG. 1, these systems, devices, methods and/or computer program products 100 may include a plurality of electronic devices 160 that are configured for communication via a network 140. The electronic devices 160 may be wired or wireless communication terminals, such as desktop computers, laptop computers, cellular telephones, smart phones, electronic book readers, tablets, game consoles or any other devices that may have different processing, connectivity or user interface capabilities, and may include various types of tangible, computer-readable media. Each of the devices 160 is associated with or otherwise accessible to, one or more users 162, to access the network 140 using a wireless or wired connection. It will also be understood that a given user 162 may own one or more devices 160 of various configurations, or may use a device 160 that is owned or controlled by another entity. Moreover, a given user 162 may be a human user or an autonomous program, often referred to as a "robot".

The network 140 may represent one or more of a Local Area Network (LAN), Wide Area Network (WAN) and Intranet or other private network that may not be accessible by the general public, or a global network, such as the Internet or other publicly accessible network. The network 140 provides communications among the user devices 160 and an advertisement server 110.

The advertisement server 110 is configured to, among other functions, provide or identify advertisements for presentation at the devices 160. The advertisement server 110 may include a network transceiver, processor, memory and/or other circuitry configured to coordinate and manage operations for providing advertisements to the devices 160 via the network 140. The advertisement server 110 may be embodied as a standalone server or may be contained as part of other computing infrastructures. The advertisement server 110 may be embodied as one or more enterprise, application, personal, pervasive or embedded computer systems that may be standalone or interconnected by a public or private, real or virtual, wired or wireless network including the Internet, and may include various types of tangible, non-transitory computer-readable media. The advertisement server 110 may also communicate with the network 140 via wired or wireless connections, and may include various types of tangible, non-transitory computer-readable media.

The advertisements that are provided or identified by the advertisement server 110 may be obtained from an advertisement data store 130. The advertisement data store 130 may be controlled by the same entity that operates the advertisement server 110 or by a different entity. The advertisement data store 130 may store multiple advertisements, a respective one of which also includes one or more associated identifiers or tags. The identifiers or tags may include, for example, an identification of a program, campaign, product type or service type that is associated with the advertisement, an identification of the advertiser, an identification of the associated advertising revenue model and many other identifiers or tags. The advertisement data store 130 may be populated with advertisements by advertisers and/or their agents. The advertisement data store 130 may be accessed by the advertisement server 110 in response to a request for advertisement from a device 160, such as from a web browser that runs on a device 160. The browser may request one or more advertisements to be associated with a web page to be rendered by the browser on the device 160 for display to the user 162.

The user information data store 150 contains user information indicative of preferences and/or behavioral patterns of users, such as the users 162 that use devices 160. The user information may be aggregated from multiple sources or may be assembled from a single source. The information may include user identification, demographic information, behavioral history, consumption patterns, brand loyalty, interaction history with advertisements or other attributes of a particular user. However, a user identification need not be provided for a given user. Rather, behavioral history, consumption patterns, brand loyalty, advertisement interaction history and other information may be stored without providing user identification or demographic information.

The advertisement data store 130 and the user information data store 150 may be embodied as one or more enterprise, application, personal, pervasive or embedded storage devices that may be standalone or interconnected by a public or private, real or virtual, wired or wireless network including the Internet, and may include various types of tangible, non-transitory computer-readable medium.

The advertisement server 110 includes a revenue model-based advertisement selector 120 according to various embodiments described herein. The revenue model-based advertisement selector 120 may be embodied in hardware or in software that runs on a processor, such as the processor(s) of the advertisement server 110. The revenue model-based advertisement selector 120 may be configured to communicate with the advertisement data store 130, directly or via the network 140, to select advertisements to be provided to the users 162 based at least in part on information that is maintained in the user information data store 150 and the advertising revenue model that is associated with the advertisements in the advertisement data store 130.

In general, the revenue model-based advertisement selector 120 is configured to select at least one advertisement to be provided for presentation to a user 162 from multiple advertisements that are identified, based at least in part on the user's past interaction with advertisements and the associated advertising revenue models of the multiple advertisements that were identified, as will be described in detail below. In some embodiments, the revenue model-based advertisement selector 120 is configured to select an advertisement that is associated with a first advertising revenue model rather than an advertisement that is associated with a second advertising revenue model, based at least in part on the user's past interaction with advertisements.

For example, assume that a group of advertisements is identified that may be provided to a device 160 in response to receiving a request for an advertisement from the device 160. Continuing with this example, suppose that some of the advertisements in the group are associated with a pay-per-click advertising revenue model, while other advertisements in the group are associated with a pay-per-impression advertising revenue model. Then, in some embodiments, the revenue model-based advertisement selector 120 may be configured to select an identified pay-per-click advertisement or an identified pay-per-impression advertisement for presentation to the user 162 based at least in part on the user's past clicking frequency on advertisements. The selection of a pay-per-click advertisement vs. a pay-per-impression advertisement may be based on the user's clicking frequency relative to a given threshold. For example, a pay-per-click advertisement may be selected rather than a pay-per-impression advertisement based upon the user's clicking frequency being above the given threshold. This threshold may be based on the value of revenue-per-click relative to revenue-per-impression and, in some embodiments, may be an inverse of the ratio of revenue-per-click to revenue-to-impression. For example, if revenue-per-click is 10 cents, and revenue-per-impression is 1 cent, then the threshold may be 10%, so that if a user's clicking frequency exceeds 10%, pay-per-click advertisements are selected rather than pay-per-impression advertisements.

Moreover, in some embodiments, the revenue model-based advertisement selector 120 may be configured to select only, or substantially only, pay-per-click advertisements if the user's clicking frequency exceeds the threshold and to select only, or substantially only, pay-per-impression advertisements, if the user's clicking frequency is less than the threshold. In the example above, users that click on 10% or more of advertisements may receive only pay-per-click advertisements and users that click on less than 10% of advertisements may receive only pay-per-impression advertisements. Thus, users 162 that are more likely to click on advertisements are more likely to receive pay-per-click advertisements, and users 162 that are less likely to click on advertisements are more likely to receive pay-per-impression advertisements. In fact, in some embodiments, users may be divided into two groups: those that click above a certain percent of all advertisements and those that do not. All pay-per-click advertisements may go to the first group and all pay-per-view advertisements may go to the second group.

It will be understood that the above described "all or nothing" approach may be modified to provide, for example, at least one pay-per-impression advertisement on a web page, even if the remaining advertisements are pay-per-click advertisements, since the user can only click on one advertisement. Accordingly, it may be desirable to allow revenue to be generated from pay-per-impression advertisements, even though there is a high likelihood that the user will click on one of the advertisements. Conversely, it may be desirable to add at least one pay-per-click advertisement to a web page that has multiple pay-per-impression advertisements, to allow for the possibility that user will click on this advertisement. Accordingly, rather than an all or nothing approach, various percentages or frequencies of pay-per-click vs. pay-per-impression advertisements may be selected by the revenue model-based advertisement selector 120, to apply to multiple advertisements to be provided to the user, serially or in parallel.

The revenue model-based advertisement selector 120 may operate independent of other advertising techniques or in cooperation with one or more other advertising techniques. For example, the revenue model-based advertisement selector 120 may operate on a "per-campaign" basis, on a "per-program" basis, on a "per product category" basis or on a "per service category" basis. In advertising, a campaign generally refers to a single message that is delivered to many users 162 one or more times. The message may have identical content for all users 162 or the content of the message may be varied depending upon the campaign delivery technique or the device 160 capabilities. The content in the campaign message may also be personalized for the individual user 162 or device 160. Campaigns may also be grouped into "programs" of generally similar campaigns that may have the same type of content or may target the same type of users 162. Accordingly, the advertisements of a desired advertising revenue model may be selected separately for a user 162 for a given campaign or for a given program of campaigns based on past interactions of the user 162 with advertisements of the given campaign or the given program, or of a similar campaign or a similar program. "Per product category" or "per service category" revenue model-based advertisement selection also may be provided. Moreover, a campaign, program, product category or service category to be advertised to a user 162 may itself be selected from among multiple choices, based on the past interaction of the user to advertisements of the various revenue models, as will be described in detail below.

Targeting may also be used with the revenue model-based advertisement selector 120. As is well known, targeting is a technique that is conventionally used to select advertisements for presentation to a user. Behavioral targeting uses user profiles for advertisement selection, whereas contextual targeting uses information known about the content, such as the web page on which the advertisement will be displayed. Behavioral or contextual targeting may take place prior to revenue model-based advertisement selection or after revenue model-based advertisement selection. Thus, a set of targeted advertisements may be identified and then at least one of these advertisements may be selected by the revenue model-based advertisement selector 120. Alternatively, revenue model-based advertisement selection may take place and then the advertisements may be further selected based on targeting techniques.

Selection of advertisements based on an advertising revenue model may also be performed in response to identification of the user 162 as a "directed shopper" or as tending towards a directed shopper. Selection of advertisements based on an advertising revenue model may also be performed in order to induce an interaction from the user 162 that differs from the past interactions of the user 162 to advertisements of a given revenue model. Examples will be provided below.

Although FIG. 1 illustrates an example communications environment 100 in accordance with some embodiments, it will be understood that the present disclosure is not limited to such a configuration but is intended to encompass any configuration capable of carrying out the operations described herein. For example, although discussed above with reference to a single advertising server 110 and revenue model-based advertisement selector 120, some embodiments may include a plurality of distributed network elements that collectively perform the operations described herein to provide a distributed advertising marketplace. More generally, various functionality described herein in separate functional elements may be combined within a single functional element and, vice versa, functionality described herein in single functional elements can be carried out by a plurality of separate functional elements.

Figure 2:
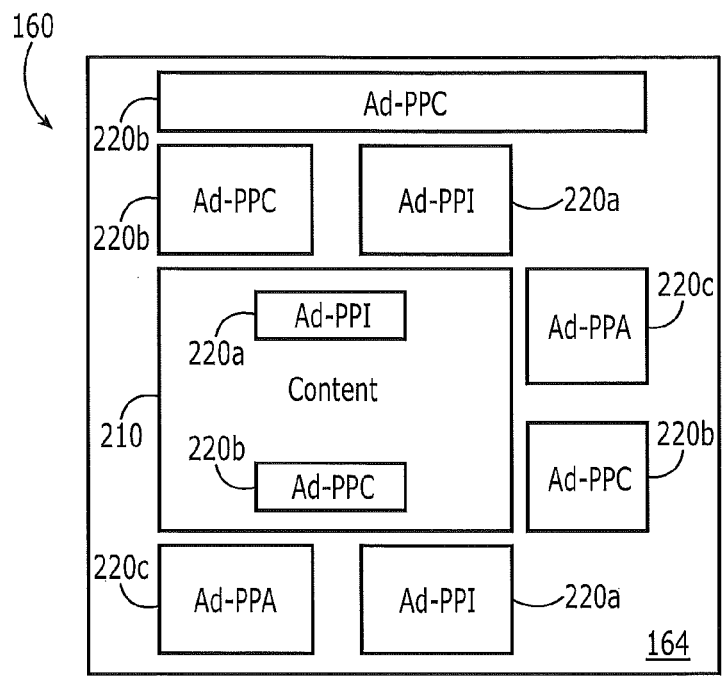
FIG. 2 illustrates a display of a user device according to various embodiments described herein.

FIG. 2 illustrates an example of a web page that is displayed on a display 164 of a device 160 according to various embodiments described herein. As shown, the display 164 may provide a presentation of web content 210 and a plurality of advertisements ("ads") 220 at various positions of the display 164, within or outside the content 210. Any type of advertisement may be provided. For example, a banner advertisement may be provided above the content 210, a text advertisement may be provided alongside the content 210, and one or more advertisements may be provided within the content 210. FIG. 2 illustrates that a single web page that is rendered on the display 164 may include advertisements 220 that are associated with different revenue models. By way of example only, the web page displayed on display 164 shown in FIG. 2 includes advertisements 220a that are associated with the pay-per-impression revenue model ("Ad-PPI"), advertisements 220b that are associated with the pay-per-click revenue model ("Ad-PPC"), and advertisements 220c that are associated with the pay-per-acquisition revenue model ("Ad-PPA"). The user 162 typically cannot tell if the advertisement is a PPI advertisement 220a, a PPC advertisement 220c or a PPA advertisement 220c. As described above, various embodiments described herein can select the number of advertisements of the various revenue models 220a, 220b or 220c that are displayed on the display 164, in response to past behavior of the user 162, for example past interactions of the user 162 with advertisements.

Use Case Example

Selecting Pay-Per-Click Advertisements for High Clicking Frequency Users

Figure 3:
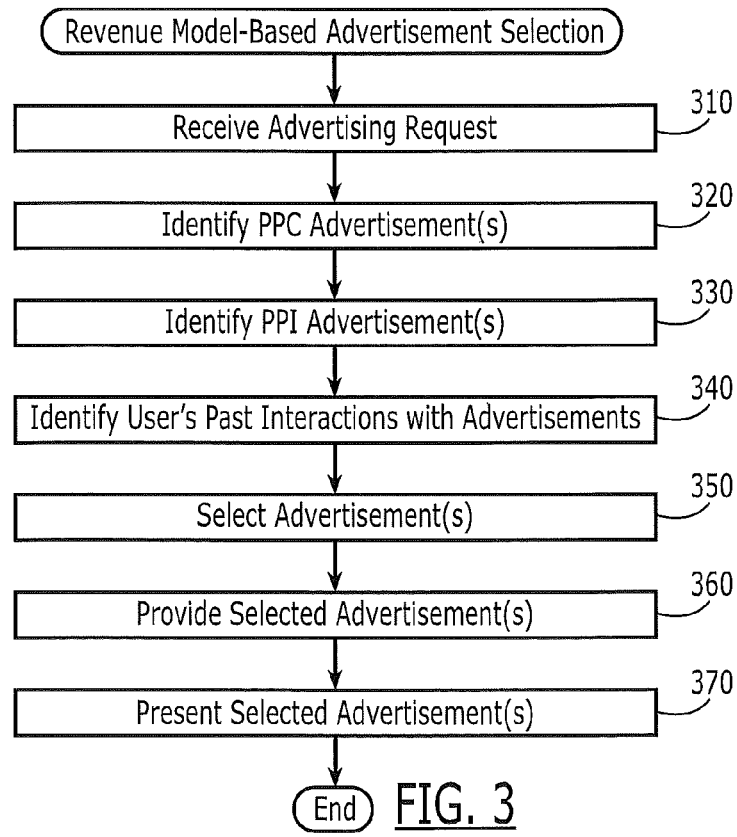
FIG. 3 is a flowchart of operations that may be performed to provide revenue model-based advertisement selection according to various embodiments described herein.

FIG. 3 is a flowchart of operations that may be performed to select advertisements based on their advertising revenue model, according to various embodiments described herein. These operations may be performed, for example, by the revenue model-based advertisement selector 120 in cooperation with one or more of the other elements of FIG. 1.

Referring to FIGS. 1 and 3, an advertising request is received at the advertising server 110 from a device 160, at Block 310. For example, in the web browsing environment, a call for an advertisement may be received from a web browser running on a device 160. The advertisement request may be associated with a web page to be rendered by the browser for display to the user 162.

At Block 320, at least one pay-per-click ("PPC") advertisement is identified that may be displayed to the user in response to the advertising request of Block 310. At Block 330, at least one pay-per-impression ("PPI") advertisement is identified that may be displayed to the user in response to the advertising request at Block 310. It will be understood that embodiments of FIG. 3 only identify pay-per-click advertisements and pay-per-impression advertisements. However, pay-per-acquisition advertisements and advertisements based on other advertising revenue models may also be included. The advertisements that are identified in Blocks 320 and 330 may be based on conventional targeting techniques, or may be identified based on other techniques. At Block 340, the user's past interactions with advertisements are identified. For example, the user's browsing history of advertisements may be identified.

Then, at Block 350, at least one advertisement is selected from a group that includes the at least one pay-per-click advertisement that was identified at Block 320 and the at least one pay-per-impression advertisement that was identified at Block 330. The selection of Block 350 takes place based at least in part upon the user's browsing history of advertisements or other past interactions with advertisements that were identified at Block 340, and whether the at least one advertisement is a pay-per-click advertisement or a pay-per-impression advertisement. At Block 360, the at least one advertisement that was selected at Block 350 is provided in response to the request. The selected advertisements may be provided by providing an identifier of the advertisement to the device 160 that requested the advertisement. Then, at Block 370, the selected advertisement(s) are presented, for example by the device 160 requesting an advertisement that corresponds to the identifier that was provided at Block 360 from the advertisement data store 130, and displaying the advertisement that is provided by the advertisement data store 130 on the display 164.

Figure 4:
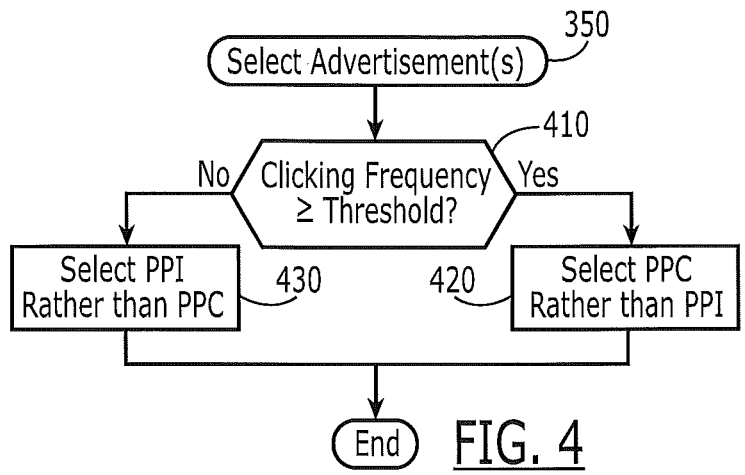
FIG. 4 is a flowchart of operations that may be provided to select advertisements according to some embodiments of Block 350 of FIG. 3.

FIG. 4 is a flowchart of operations that may be performed to select advertisements, which may correspond to Block 350 of FIG. 3. In these embodiments, the user's past interactions with advertisements that are identified at Block 340 include a user's clicking frequency on advertisements.

At Block 410, a determination is made as to whether the clicking frequency of a given user 162 on advertisements is equal to or exceeds a threshold. It will be understood that the clicking frequency may be unweighted or may be weighted over time in many ways, such as weighted from the time the user 162 became a user 162, weighted over a sliding time frame such as the last month, or a weighted so that more recent clicks count more than older clicks. Moreover, in some embodiments, when sufficient clicking history is not available for a given user 162, a clicking frequency may be determined based on a user group that has similar characteristics as the given user 162. For example, a relatively new user 162 may be classified in a user group based on demographics of the new user. The clicking frequency may apply to all user interactions with advertisements within a given time period. In other embodiments, clicking frequency may be determined separately for a given or similar campaign, program, product category, service category, etc., to predict the user's clicking behavior. It will also be understood that the threshold of Block 410 may be fixed or may vary over time. In some embodiments, the threshold may be the inverse of a ratio of revenue-per-click to revenue-per-impression. For example, if revenue-per-click is 10 cents and revenue-per-impression is 1 cent, then the given threshold may be a clicking frequency of 10%.

Still referring to FIG. 4, at Block 420, if the clicking frequency is equal to or exceeds the threshold at Block 410 (the "YES" branch), then a pay-per-click advertisement is selected rather than a pay-per-impression advertisement. Otherwise, if the clicking frequency is less than the threshold at Block 410 (the "NO" branch), a pay-per-impression advertisement is selected rather than a pay-per-click advertisement at Block 430. In some embodiments, using the example above, users that clicked on 10% or more of advertisements will receive only pay-per-click advertisements and users that clicked on less than 10% of advertisements will receive only pay-per-impression advertisements.

Embodiments of FIG. 4 may be applied to an individual advertisement that is requested, to multiple advertisements that are requested in a given request, or to multiple requests to provide advertisements. Moreover, many variations may be provided. For example, even when all pay-per-click advertisements are called for on a given web page, it may be desirable to include at least one pay-per-impression advertisement, since the user can only click on one advertisement. Conversely, even if all pay-per-impression advertisements are called for, at least one pay-per-click advertisement that is highly targeted to the given user may also be included. In still other embodiments, a mix of various revenue model advertisements may be provided when multiple advertisements are to be displayed on a given web page, but the ratio of advertisements of the various revenue models may be changed (increased or decreased) based upon the user's clicking frequency relative to a threshold. In other embodiments, targeting techniques may override at least some of the revenue model-based advertisement selection, to ensure that highly relevant advertisements are provided, notwithstanding their revenue model.

Use Case Example

Revenue Model-Based Advertisement Selection for Multiple Revenue Models

Figure 5:
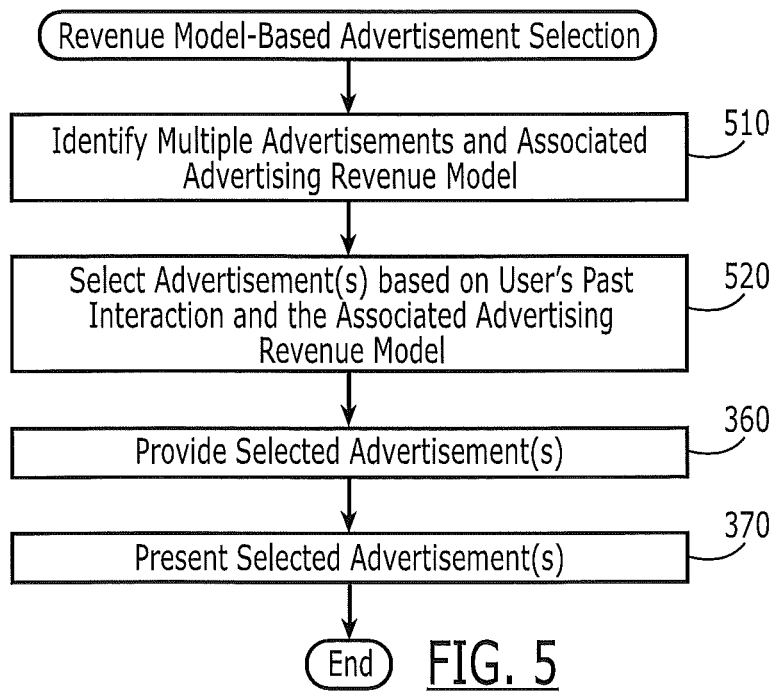
FIG. 5 is a flowchart of other operations that may be performed to provide revenue model-based advertisement selection according to various other embodiments described herein.

FIG. 5 is a flowchart of other operations that may be performed for revenue model-based advertisement selection, according to various other embodiments described herein. These operations may be performed, for example, by the revenue model-based advertisement selector 120 of FIG. 1 in cooperation with one or more of the other elements of FIG. 1.

Referring to FIGS. 1 and 5, at Block 510, multiple advertisements that can be provided for presentation to a user are identified. A respective advertisement has an associated advertising revenue model. The advertising revenue models may include a pay-per-impression, a pay-per-click and a pay-per-acquisition advertising revenue model. The multiple advertisements and their associated advertising revenue models may be identified using any advertisement identification technique. Advertisements may be selected randomly, based on the terms of an advertising contract or using other techniques to identify multiple advertisements that can be provided for presentation to a user, a respective advertisement having an associated advertising revenue model.

Then, at Block 520, at least one advertisement to be provided for presentation to the user 160 is selected from the multiple advertisements that were identified at Block 510, based at least in part on the user's past interaction with advertisements and the associated advertising revenue models of the advertisements that were identified. Operations at Blocks 360 or 370 are then performed, as was described above.

Figure 6:
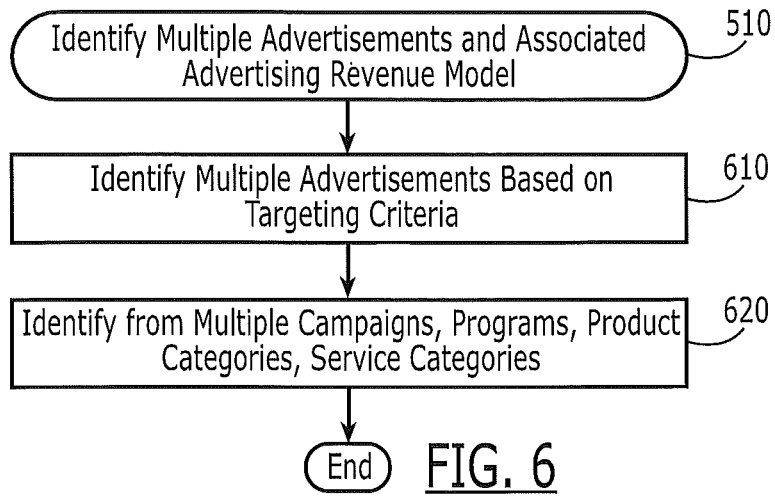
FIG. 6 is a flowchart of operations that may be performed to identify multiple advertisements and associated advertising revenue models according to various embodiments of Block 510 of FIG. 5.

FIG. 6 is a flowchart of operations that may be performed to identify multiple advertisements and associated advertising revenue models using other advertising techniques, according to various embodiments described herein. These operations may be used to further perform operations of Block 510. As illustrated at Block 610, multiple advertisements that can be provided for presentation to a user may be identified based at least in part on contextual or behavioral targeting criteria. As will be described in FIG. 7 below, targeting may also be performed as part of advertising selection based on the user's past interaction, instead of or in addition to being performed as part of the advertisement identification at Block 610. Moreover, as illustrated at Block 620, the identifying may be performed separately for a given advertising campaign, advertising program, advertising product category or advertising service category. It will also be understood that the order of operations of Block 610 and Block 620 may be reversed, or one or both of these blocks may be omitted.

Figure 7:
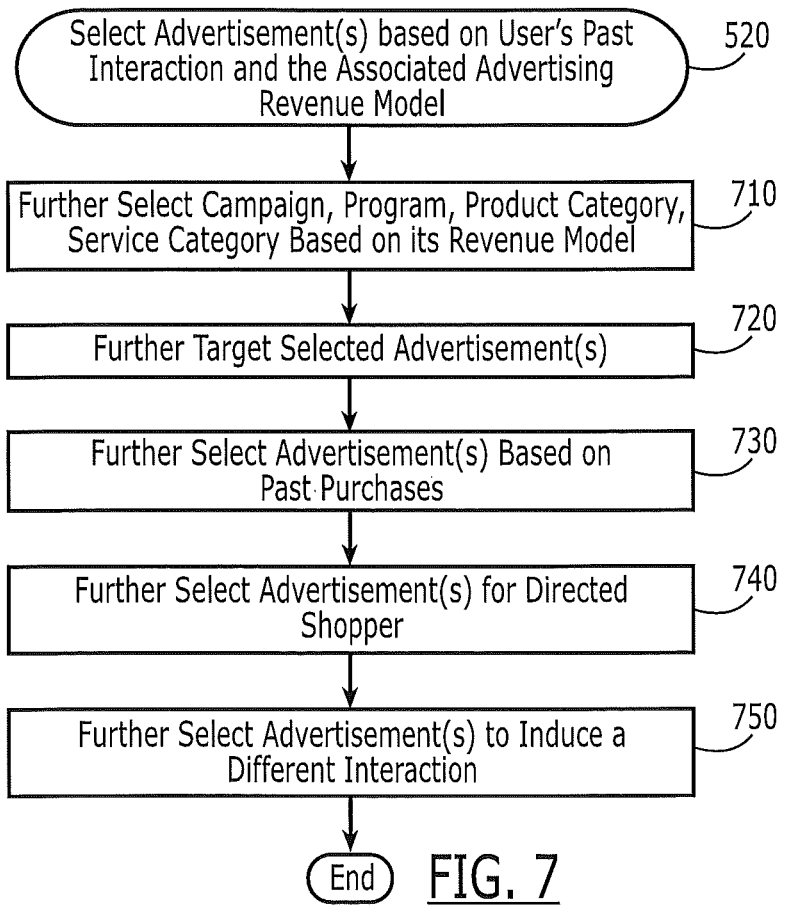
FIG. 7 is a flowchart of operations that may be performed to select advertisements based on a user's past interaction and the associated revenue model according to various embodiments of Block 520 of FIG. 5.

FIG. 7 is a flowchart of operations that may be performed to select advertisement(s) based on the user's past interaction and the associated advertising revenue model, which may correspond to Block 520 of FIG. 5. One or more of the operations of FIG. 7 may also be used to further select advertisements to be provided to a user.

Referring to Block 710, a campaign, program, product category or service category may itself be selected based on its revenue model. For example, a given campaign may be a pay-per-impression campaign or a pay-per-click campaign. Advertisements may be identified that are associated with an advertising campaign, an advertising program, an advertising product category or an advertising service category, wherein a respective advertising campaign, advertising program, advertising product category and advertising service category has an associated advertising revenue model. Then, advertisements that are associated with at least one advertising campaign, advertising program, advertising product category or advertising service category to be provided for presentation to the user are selected from the multiple advertisements that were identified. The advertisements may be provided based at least in part on the user's past interaction with advertisements and the associated advertising revenue model of the advertising campaign, advertising program, advertising product category or advertising service category. In summary, not only can revenue model-based advertisement selecting be performed on a per-campaign, per-program, per-product category or per-service category, as was illustrated at Block 620, but revenue model-based advertisement selection may be used to select the actual campaign, program, product category or service category to be presented, as was illustrated at Block 710.

Referring to Block 720, the advertisements that were selected based on their revenue model may be further targeted. Thus, targeting may take place as part of the selection process of Block 520 in addition to or instead of the identification process of Block 510. In embodiments of Block 720, at least one advertisement to be provided for presentation to the user is selected from the multiple advertisements that were identified, based at least in part on the user's past interaction with advertisements, the associated advertising revenue models of the multiple advertisements that were identified, and contextual or behavioral targeting criteria.

Referring now to Block 730, the advertisements may be further selected based at least in part on past purchases of the user. For example, the ratio of pay-per-click advertisements for products or services that are related to past purchases of the user may be increased relative to pay-per-impression advertisements for related products or services, because the user is more likely to click on advertisements to related products or services after an initial purchase. In other embodiments, past purchases may be used to identify which advertisement of a given revenue model to provide. For example, assume it is desired to provide 75% pay-per-impression advertisements and 25% pay-per-click advertisements, and there are four advertisements on a given web page. When it is time to select advertisements for the given web page, a pay-per-click advertisement may be selected for a product or service that is most relevant to the user, because the user is more likely to click on it. The remaining three pay-per-impression advertisements can be, for example, campaigns for which impressions are desired to be recorded, and that need not be as relevant to the user.

Referring now to Block 740, further selection of the advertisements may be provided based on identification of a user as a "directed shopper". A directed shopper is a user 162 that does not generally browse advertisements, but, rather, accesses a website or other resource in order to make a purchase. On the other hand, a user that is not directed may browse a website or other resource in order to view its content and/or to identify or investigate products or services that are available. A user that is not a directed shopper may sometimes be referred to as a "browser". In some embodiments, a directed shopper may be identified by an average session length of the user. A short session length or a short session length followed by a purchase may indicate a directed shopper. A long session length or no purchase may indicate a shopper that is not directed.

In some embodiments of Block 740, if the user 162 is identified as a directed shopper, there may be a lower likelihood that the user 162 will click on advertisements, so that the revenue model-based selection may be further adjusted to favor pay-per-impression advertisements. On the other hand, if the user is identified as not being a directed shopper, there may be some likelihood that the user will click on one of the advertisements that are presented during a long session, so that the revenue model-based selection may be further adjusted to favor pay-per-click advertisements at Block 740. It will be understood that a user 162 may be identified on a scale that indicates a tendency towards being a directed shopper and that a user's identification may vary based on content of advertisements, product being advertised, etc.

Block 750 illustrates other operations wherein revenue model-based advertisement selection may be further adjusted to induce an interaction from the user 162 that differs from the user's past interaction with advertisements. For example, some advertisements may be presented to "exploit" the past interactions of a user 162. Other advertisements may be presented in order to "explore" whether a user 162 might be interested, notwithstanding the user's past interactions, in an attempt, for example, to broaden the user's interactions, or to increase the advertiser's understanding of the user. Accordingly, if it is desired to induce an interaction that differs from past interactions, then more pay-per-impression advertisements may be provided relative to pay-per-click advertisements, because there may be a low likelihood that these advertisements will be clicked on. In other scenarios, in order to measure an advertisement's ability to attract the user 162 to explore other products or services, more pay-per-click advertisements may be provided. It will also be understood that selection to induce a different interaction may be performed on a per-session basis rather than on a permanent or multi-session basis. Moreover, if the user clicks on an advertisement that was selected for "exploit" purposes, this information may be recorded, the advertising click history for the user may be modified and the contents of the advertisement may also be recorded for future targeting.

It will also be understood that Blocks 710-750 may be performed in any order, and that one or more of these blocks may be omitted.

Use Case Example

Revenue Model-Based Advertisement Selection Based on Session Length

Block 740 of FIG. 7 illustrated further selecting advertisements based on the degree to which the user is a directed shopper. According to other embodiments, these operations may be used independently to select at least one advertisement to be provided to the user, as illustrated in FIG. 8.

Figure 8:
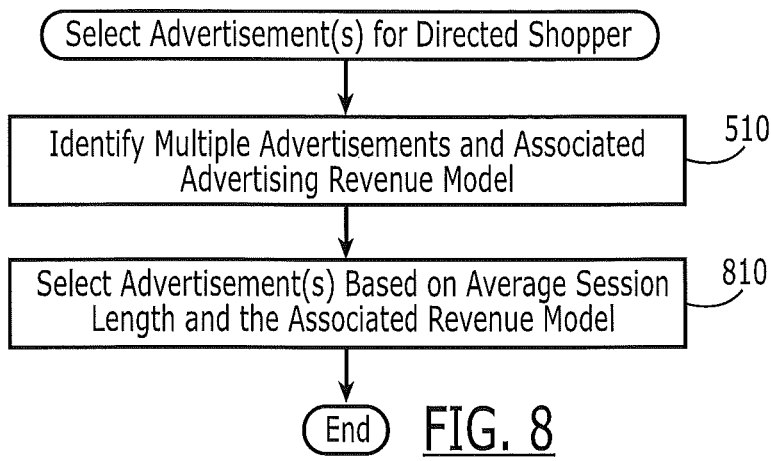
FIG. 8 is a flowchart of operations that may be performed to select advertisements for a directed shopper according to various embodiments described herein.

Referring to FIG. 8, operations of Block 510 are performed to identify multiple advertisements that can be provided for presentation to a user, wherein a respective advertisement has an associated advertising revenue model. Then, at Block 810, at least one advertisement is selected to be provided for presentation to the user from the multiple advertisements that were identified, based at least in part on an average session length of the user and the associated advertising revenue models of the multiple advertisements that were identified. These operations may be performed according to any of the embodiments that were described in connection with Block 740 above.

Accordingly, directed shopper identification may be used to select advertisements based on advertising revenue models, independent of the past interactions of the user 162 to advertisements. Moreover, in other embodiments, operations of Blocks 730 or 750 may be used to select advertisements based on advertising revenue models, independent of the past interactions of the user 162.

Other Embodiments

Various embodiments described herein can select advertisement(s) for presentation based on the associated revenue model and on past user behavior, so as to increase or maximize advertising revenue at, for example, an e-commerce website. It will be understood that, in many cases, the e-commerce website is also selling its own products or services. Accordingly, use of various embodiments described herein may be integrated with the selling of products or services of the e-commerce website. For example, although various embodiments described herein may indicate an increase in pay-per-click advertisements relative to pay-per-impression advertisements, the percentage increase of pay-per-click advertisements may be dampened in order to discourage a user from leaving the e-commerce website.

Various embodiments have been described fully herein with reference to the accompanying figures, in which various embodiments are shown. The invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray™).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of providing advertisements, the method comprising:
    receiving an advertisement request from a web browser, the advertisement request being associated with a web page to be rendered by the browser for display to a user;
    identifying at least one pay-per-click advertisement in response to the advertisement request;
    identifying at least one pay-per-impression advertisement in response to the advertisement request;
    identifying a browse history of the user, the browse history comprising information regarding a clicking frequency of the user on first advertisements other than the at least one pay-per-click advertisement and the at least one pay-per-impression advertisement;
    determining whether the clicking frequency of the user meets a threshold;
    selecting a second advertisement, said selecting comprising:
        in response to the clicking frequency of the user meeting the threshold, selecting the at least one pay-per-click advertisement as the second advertisement;
        in response to the clicking frequency of the user not meeting the threshold, selecting the at least one pay-per-impression advertisement as the second advertisement; and
    providing the second advertisement to the browser for display on the web page;
    wherein at least said identifying the browse history and determining whether the clicking frequency meets the threshold are performed by one or more computer systems comprising one or more computers.

2. The method of claim 1, wherein the threshold is an inverse of a ratio of revenue-per-click to revenue-per-impression.

3. The method of claim 1, further comprising:
    identifying, based at least in part on the browse history of the user, at least one pay-per-acquisition advertisement that may be displayed to the user in response to the advertisement request; and
    outputting the pay-per-acquisition advertisement for presentation to the user.

4. The method of claim 1, wherein the user's past interaction with the first advertisements is weighted over time.

5. The method of claim 1, wherein the user's past interaction with the first advertisements comprises past interaction with advertisements of a user group that has similar characteristics as the user.

6. The method of claim 1, wherein said selecting the selected advertisement is further based at least in part on past purchases of the user.

7. The method of claim 1, wherein said selecting the selected advertisement is further based at least in part on an average session length of the user.

8. The method of claim 1, wherein the advertisements comprise advertisements that are associated with a web page, a social network or an electronic message.

9. A system for providing advertisements, the system comprising:
- at least one computing device configured to implement one or more advertisement services, wherein the one or more advertisement services are configured to:
  - receive an advertisement request to provide an advertisement for presentation to a user;
  - identify at least one pay-per-click advertisement in response to the advertisement request;
  - identify at least one pay-per-impression advertisement in response to the advertisement request;
  - identify a browse history of the user, the browse history comprising information regarding a clicking frequency of the user on first advertisements other than the at least one pay-per-click advertisement and the at least one pay-per-impression advertisement;
  - compare the clicking frequency of the user with a threshold; and
  - select, for presentation to the user, the at least one pay-per-click advertisement or the at least one pay-per-impression advertisement based on the comparison of the clicking frequency of the user with the threshold.

10. The system of claim 9, wherein the threshold is an inverse of a ratio of revenue-per-click to revenue-per-impression.

11. The system of claim 9, wherein the advertisement service is further configured to:
- identify, based at least in part on the browse history of the user, at least one pay-per-acquisition advertisement that may be displayed to the user in response to the advertisement request; and
- output the pay-per-acquisition advertisement for presentation to the user.

12. The system of claim 9, wherein the user's browse history is weighted over time.

13. The system of claim 9, wherein the user's browse history comprises past interaction with advertisements of a user group that has similar characteristics as the user.

14. The system of claim 9, wherein the advertisement service is further configured to select the selected advertisement based at least in part on past purchases of the user.

15. The system of claim 9, wherein the advertisement service is further configured to select the selected advertisement based at least in part on an average session length of the user.

16. The system of claim 9, wherein the advertisements comprise advertisements that are associated with one or more of the following: a web page, a social network, or an electronic message.

17. The system of claim 9, wherein the one or more advertisement services are further configured to select the selected advertisement based at least in part on a session length of the user.

18. The system of claim 9, wherein the one or more advertisement services are further configured to select the selected advertisement based at least in part on an average session length of the user.

19. Non-transitory physical computer storage comprising computer-executable instructions stored thereon that, when implemented by one or more hardware processors, are configured to implement one or more advertisement services, wherein the one or more advertisement services are configured to:
- identify at least one pay-per-click advertisement;
- identify at least one pay-per-impression advertisement;
- identify a browse history of a user, the browse history comprising user information regarding a clicking frequency of the user on first advertisements other than the at least one pay-per-click advertisement and the at least one pay-per-impression advertisement;
- based on the user information, select either the at least one pay-per-click advertisement or the at least one pay-per-impression advertisement; and
- output the selected advertisement for presentation to the user.

20. The non-transitory physical computer storage of claim 19, wherein the advertisement service is further configured to select the selected advertisement by comparing the user information to a threshold, wherein the threshold is an inverse of a ratio of revenue-per-click to revenue-per-impression.

21. The non-transitory physical computer storage of claim 19, wherein the user's browse history is weighted over time.

22. The non-transitory physical computer storage of claim 17, wherein the user's browse history comprises past interaction with advertisements of a user group that has similar characteristics as the user.

23. The non-transitory physical computer storage of claim 17, wherein the advertisement service is further configured to select the selected advertisement based at least in part on a session length of the user.

24. The non-transitory physical computer storage of claim 17, wherein the advertisement service is further configured to select the selected advertisement based at least in part on an average session length of the user.

* * * * *

UNITED STATES PATENT AND TRADEMARK OFFICE
CERTIFICATE OF CORRECTION

PATENT NO. : 8,655,730 B1
APPLICATION NO. : 13/247486
DATED : February 18, 2014
INVENTOR(S) : Swan et al.

Page 1 of 1

It is certified that error appears in the above-identified patent and that said Letters Patent is hereby corrected as shown below:

In the Claims:

In column 16 at line 43, In Claim 22, change "17," to --19,--.

In column 16 at line 46, In Claim 23, change "17," to --19,--.

In column 16 at line 50, In Claim 24, change "17," to --19,--.

Signed and Sealed this
Fifth Day of August, 2014

Michelle K. Lee
*Deputy Director of the United States Patent and Trademark Office*